US012096849B2

(12) United States Patent
Hung

(10) Patent No.: US 12,096,849 B2
(45) Date of Patent: Sep. 24, 2024

(54) HOLDING DEVICE FOR A COMPUTER COMPONENT

(71) Applicant: MODERNSOLID INDUSTRIAL CO., LTD., Taichung (TW)

(72) Inventor: Chin-Jui Hung, Taichung (TW)

(73) Assignee: Modernsolid Industrial Co., Ltd., Taichung (TW)

( * ) Notice: Subject to any disclaimer, the term of this patent is extended or adjusted under 35 U.S.C. 154(b) by 19 days.

(21) Appl. No.: 18/309,008

(22) Filed: Apr. 28, 2023

(65) Prior Publication Data

US 2023/0380585 A1 Nov. 30, 2023

(30) Foreign Application Priority Data

May 25, 2022 (TW) .................................. 111119492

(51) Int. Cl.
*A47B 21/03* (2006.01)
*A47B 97/00* (2006.01)
(52) U.S. Cl.
CPC .... *A47B 21/0314* (2013.01); *A47B 2097/006* (2013.01)
(58) Field of Classification Search
CPC ....................... A47B 21/0314; A47B 2097/006
See application file for complete search history.

(56) References Cited

U.S. PATENT DOCUMENTS

| 5,131,620 | A | * | 7/1992 | Boundy | .................. | G06F 1/183 |
| | | | | | | 248/225.11 |
| 6,098,944 | A | * | 8/2000 | Pangborn | ............... | A47B 96/06 |
| | | | | | | 248/316.1 |
| 6,402,111 | B1 | * | 6/2002 | Stewart | .............. | A47B 21/0314 |
| | | | | | | 248/316.1 |
| 6,460,817 | B1 | | 10/2002 | Bosson | | |
| 6,986,491 | B2 | * | 1/2006 | Anderson | ............ | F16M 11/041 |
| | | | | | | 248/317 |
| 8,141,836 | B2 | * | 3/2012 | Saez | ...................... | F16M 13/02 |
| | | | | | | 248/295.11 |

(Continued)

FOREIGN PATENT DOCUMENTS

TW M248956 11/2004
TW M632296 9/2022

OTHER PUBLICATIONS

Search Report issued in corresponding TW Application 111119492, issued Nov. 17, 2022, and an English Translation, 2 pages.

*Primary Examiner* — Anita M King
(74) *Attorney, Agent, or Firm* — Burris Law, PLLC

(57) ABSTRACT

A holding device for supporting and suspending a computer component below a support surface includes a holding seat, a rotating rod rotatably mounted on the holding seat about an axis, a flexible strap connected with the holding seat and the rotating rod and having a bracing section for looping and bracing the computer component, and an adjusting unit disposed on the holding seat. The adjusting unit includes a retaining ring, a coupling rotary disc and a biasing member disposed on the holding seat and arranged along the axis. With the coupling rotary disc being operated to rotate the rotating rod for reeling or unreeling the flexible strap, and with the biasing member biasing the coupling rotary disc to engage with the retaining ring for retaining the rotating rod, the adjustment of the flexible strap is convenient and safe to conduct.

10 Claims, 19 Drawing Sheets

(56) References Cited

U.S. PATENT DOCUMENTS 8,500,077 B2 * 8/2013 Smed .................. A47B 21/03
  108/143
8,800,944 B2 * 8/2014 Smed .................. A47B 88/45
  108/143

* cited by examiner

HOLDING DEVICE FOR A COMPUTER COMPONENT

CROSS-REFERENCE TO RELATED APPLICATION

This application claims priority to Taiwanese Invention Patent Application No. 111119492, filed on May 25, 2022.

FIELD

The disclosure relates to a holding device for a computer component, and more particularly to a holding device for supporting a computer component, such as a desktop computer, below a support surface, such as a work surface of a desk or work station.

BACKGROUND

Referring to FIGS. 1 and 2, a conventional holding device 1 disclosed in U.S. Pat. No. 6,460,817B1 is for supporting a computer 100 under a work surface 200 of a desk. The holding device 1 is in the form of a perimeter support frame including two L-shaped female frame sections 11, two L-shaped male frame sections 12 and a mounting bracket 13. The female frame sections 11 are diagonally disposed at two sides of the computer 100, and the male frame sections 12 are diagonally disposed at opposite two sides of the computer 100. The male frame sections 12 are slidably connected within the female frame sections 11 to readily adjust the dimension of the perimeter frame 1 to suit the size of the computer 100 which is to be supported therein and gripped thereby. When installing the computer 100 underneath the desk, the mounting bracket 13 is attached to the work surface 200 using screws (not shown), and the perimeter frame 1 is fitted to the computer 100 by being loosely placing around the computer 1 and then tightened to closely grip the computer 1. The frame 1 and the computer 100 are then attached to the bracket 13 which is already screwed to the work surface 200. Thus, the computer 100 is suspended by the perimeter frame 1 to free up the working space of the work surface 200 and avoid being kicked or disturbed by the user. However, the structure of the perimeter frame 1 is complicated and the adjustment of the perimeter frame 1 is inconvenient.

SUMMARY

Therefore, an object of the disclosure is to provide a holding device that can alleviate at least one of the drawbacks of the prior art.

According to the disclosure, the holding device for supporting and suspending a computer component below a support surface includes a holding seat, a rotating rod rotatably mounted on the holding seat about an axis, a flexible strap having a first end which is secured to the holding seat, a second end which is opposite to the first end and which is disposed on the rotating rod, and a bracing section which interconnects the first end and the second end for looping and bracing the computer component, and an adjusting unit disposed on the holding seat. The adjusting unit includes a retaining ring, a coupling rotary disc and a biasing member disposed on the holding seat and arranged along the axis. The retaining ring is formed on the holding seat adjacent to an end of the rotating rod, and has a plurality of retaining teeth which are angularly disposed about the axis. The coupling rotary disc is in non-rotatable engagement with the rotating rod to be movable relative to the rotating rod along the axis and to rotate the rotating rod, and has a plurality of coupling teeth which are angularly disposed about the axis and which are meshable with the retaining teeth. The biasing member is sleeved around the rotating rod to bias the coupling rotary disc toward the retaining ring so as to bring the coupling teeth to mesh with the retaining teeth.

With the coupling rotary disc being operated to rotate the rotating rod for reeling or unreeling the flexible strap to adjust the length of the bracing section, and with the biasing member disposed to bias the coupling rotary disc to engage the coupling teeth with the retaining teeth for retaining the rotating rod, the adjustment of the flexible strap is operable with one hand so as to be convenient and safe to conduct.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
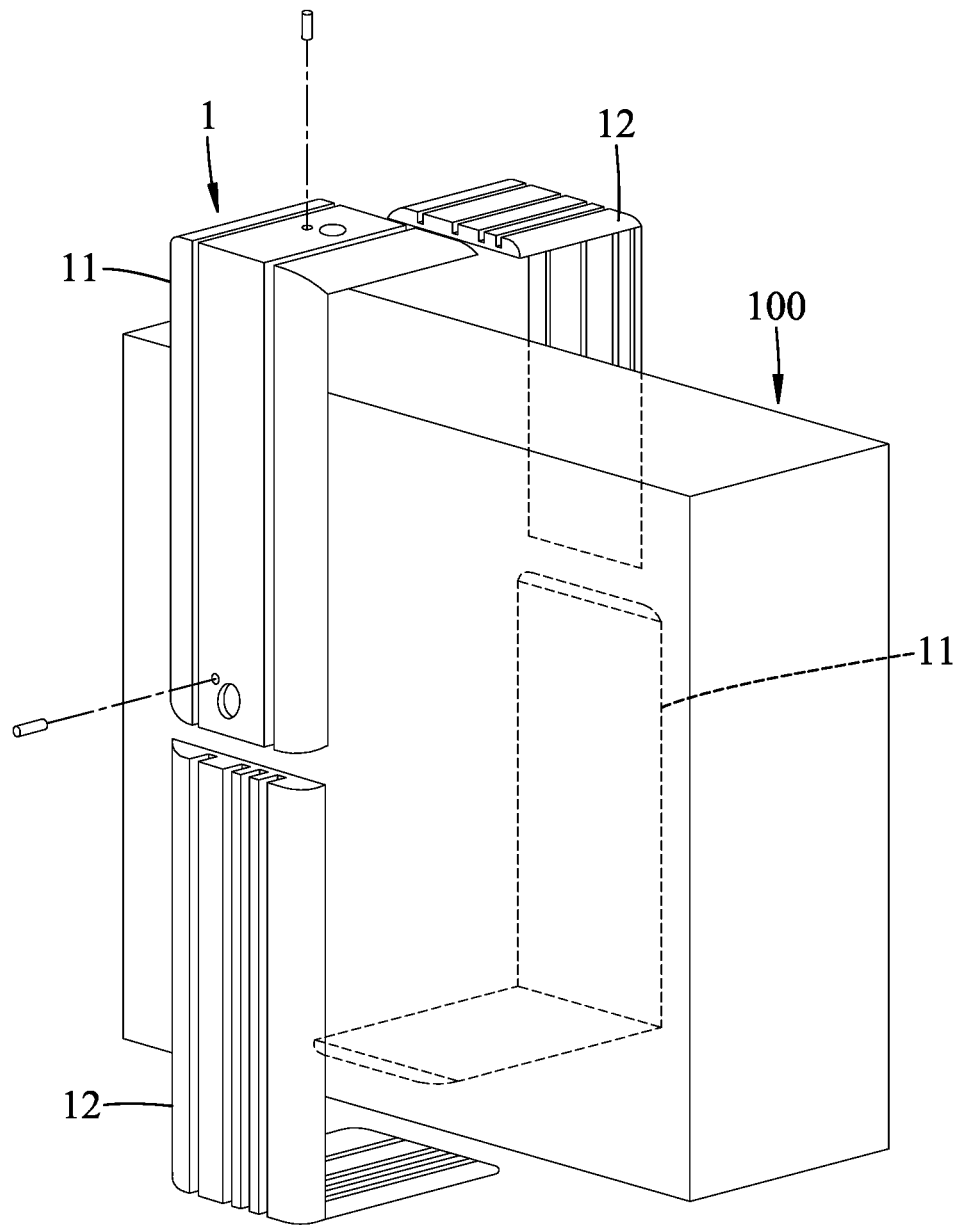
FIG. 1 is an exploded perspective view of a conventional holding device for a computer component.
Figure 2:
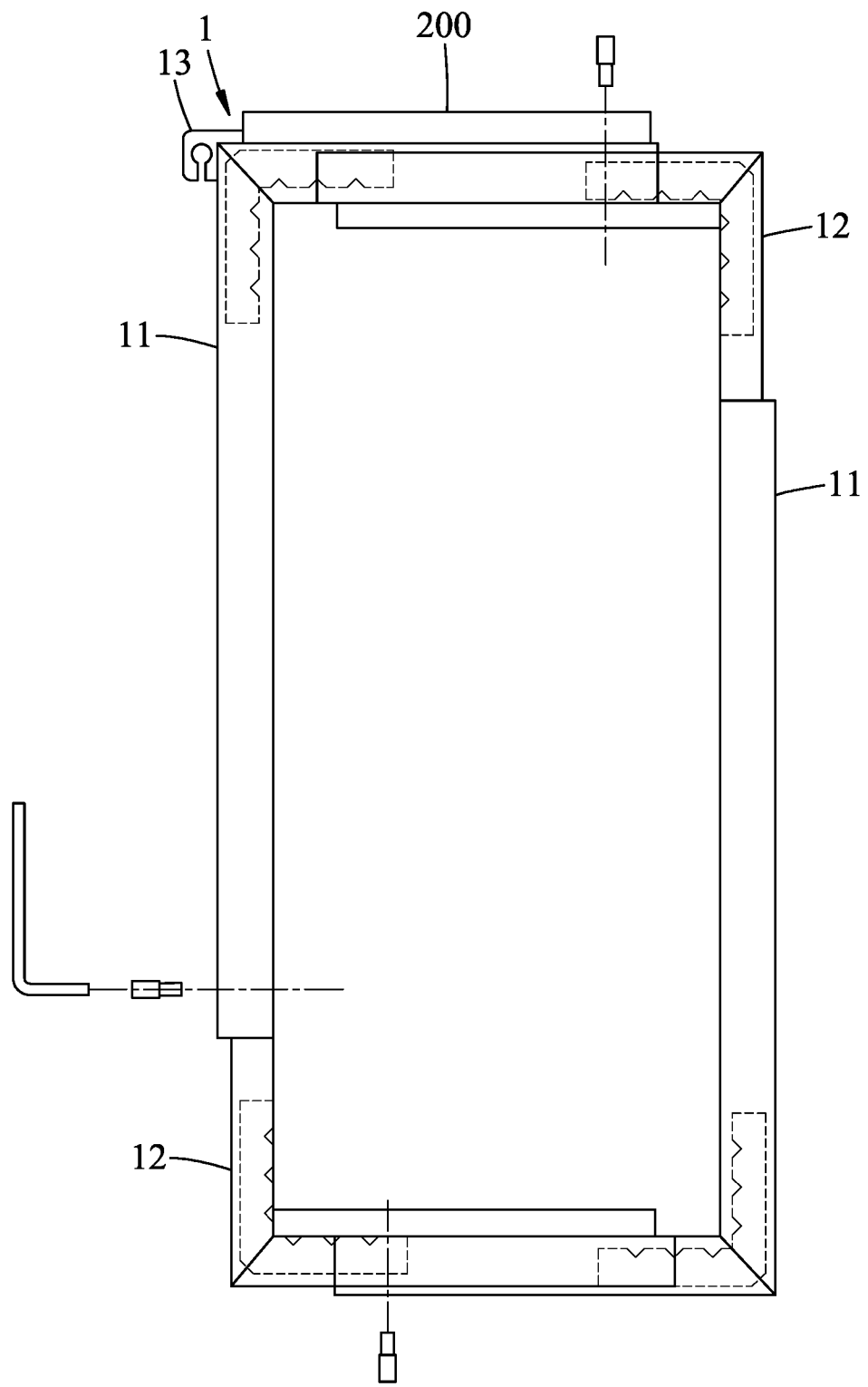
FIG. 2 is a front view of the conventional holding device.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings.

Figure 3:
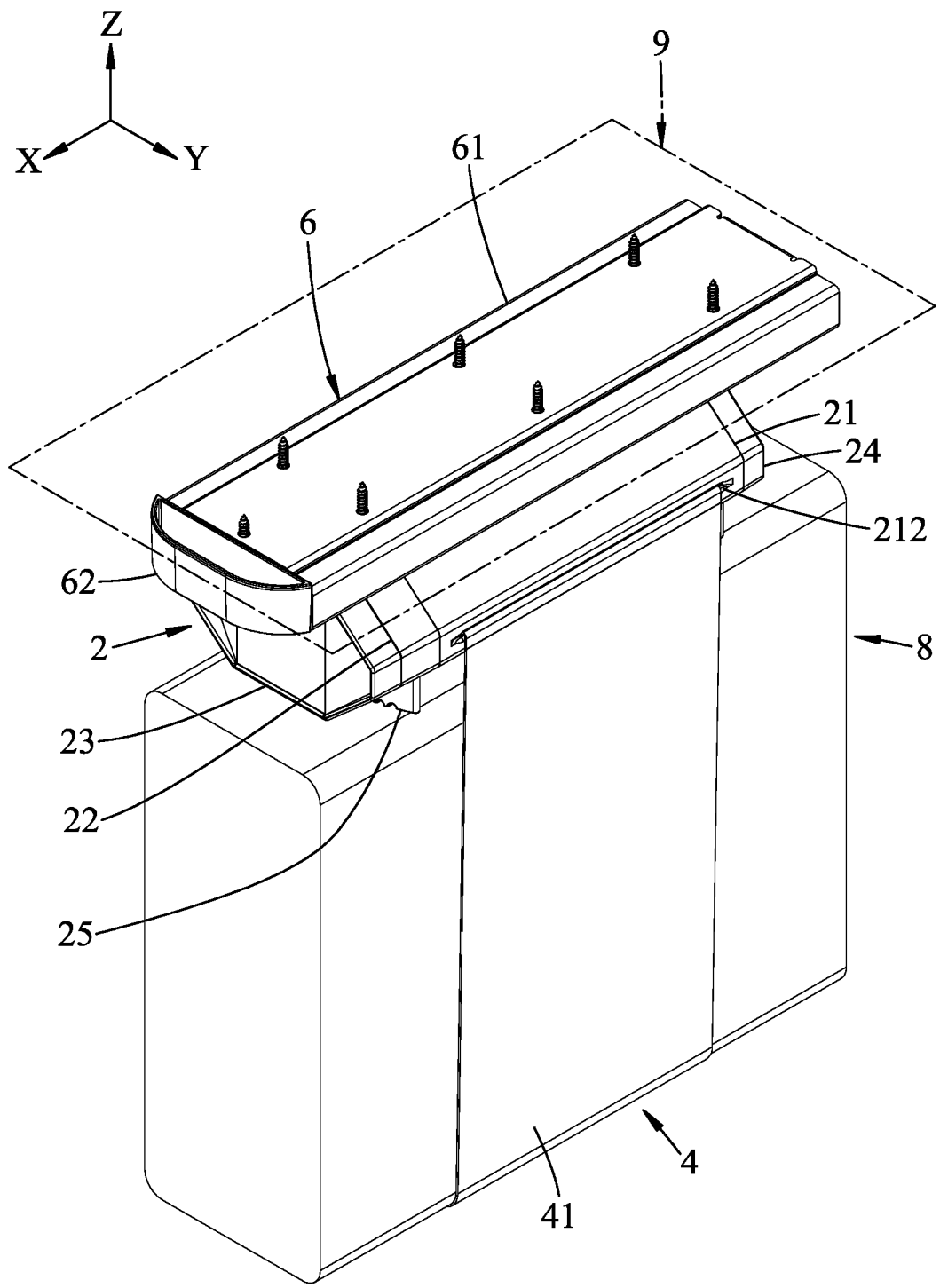
FIG. 3 is a perspective view illustrating an embodiment of a holding device according to the disclosure attached to a support surface to support a computer component below the support surface.
Figure 4:
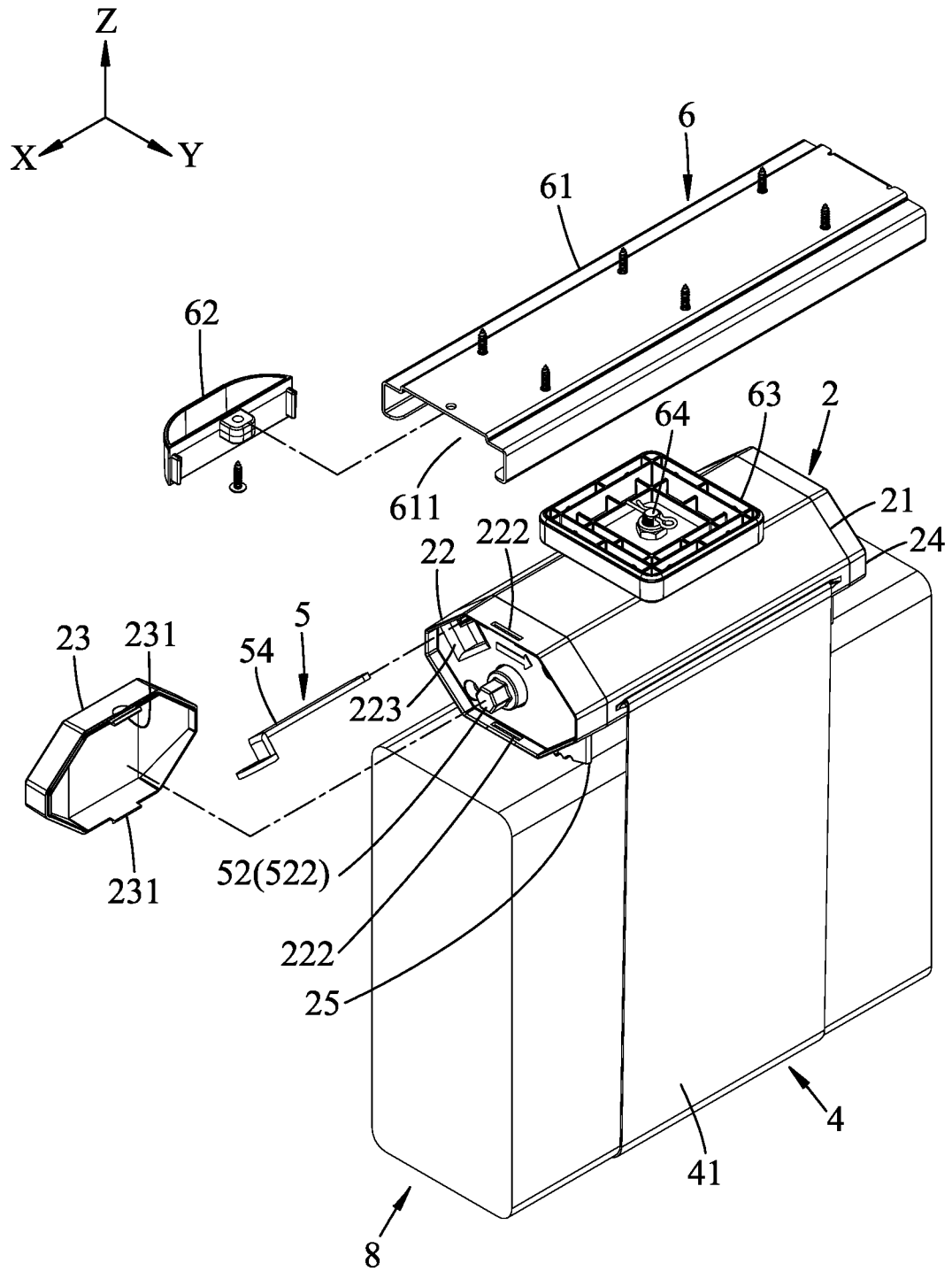
FIG. 4 is a partly exploded perspective view of FIG. 3.
Figure 5:
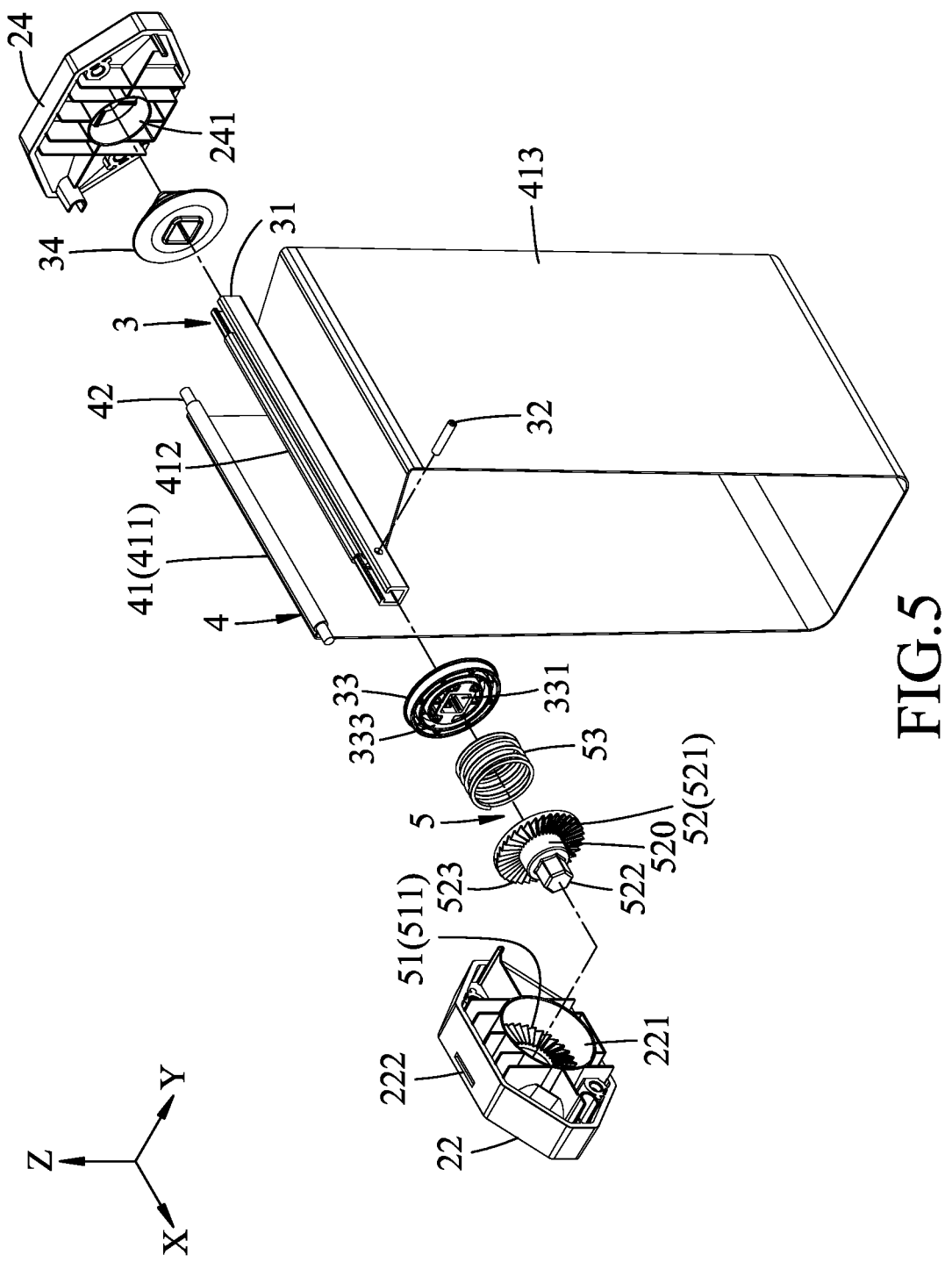
FIG. 5 is an exploded perspective view illustrating a portion of the embodiment.
Figure 6:
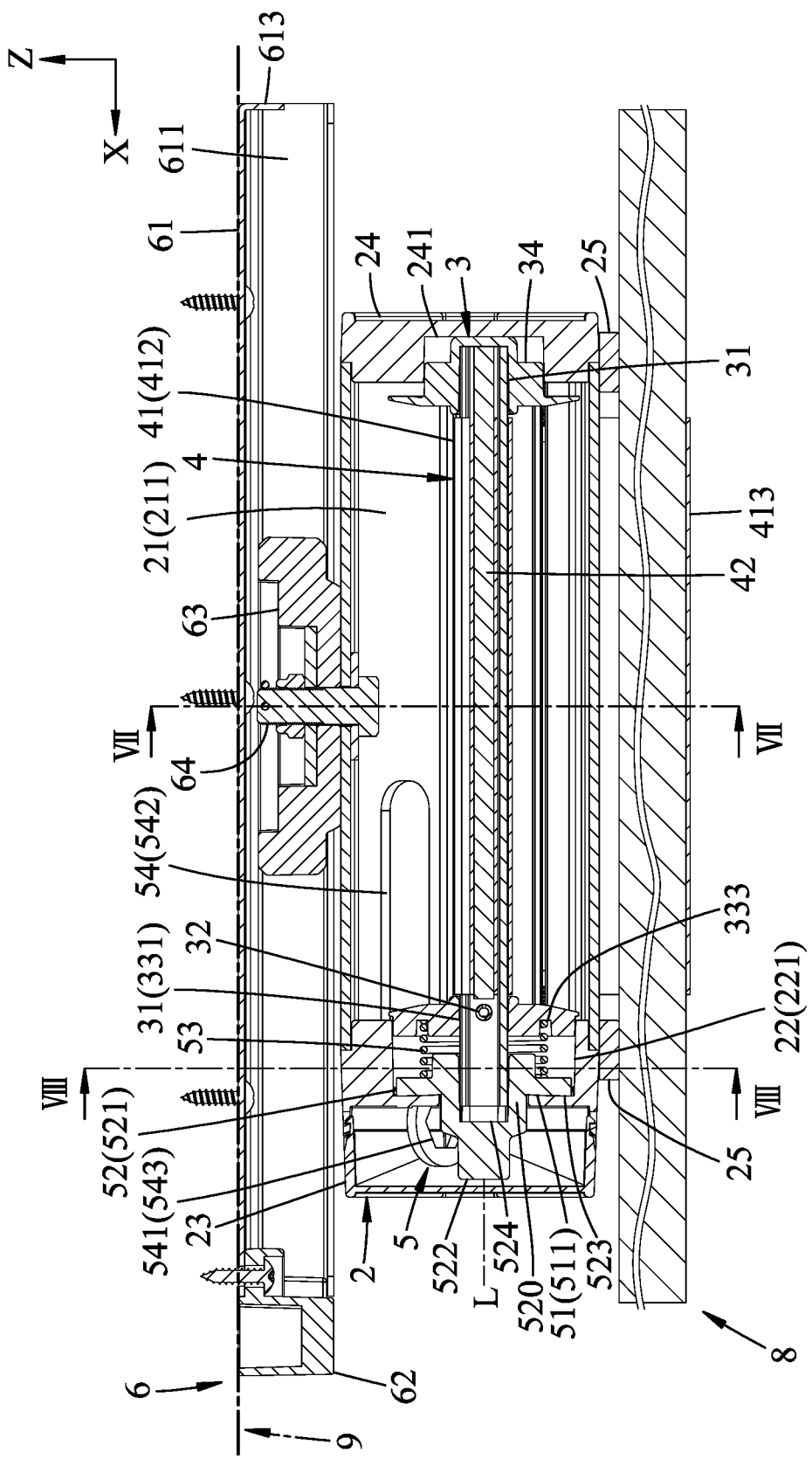
FIG. 6 is a sectional view of FIG. 3.
Figure 7:
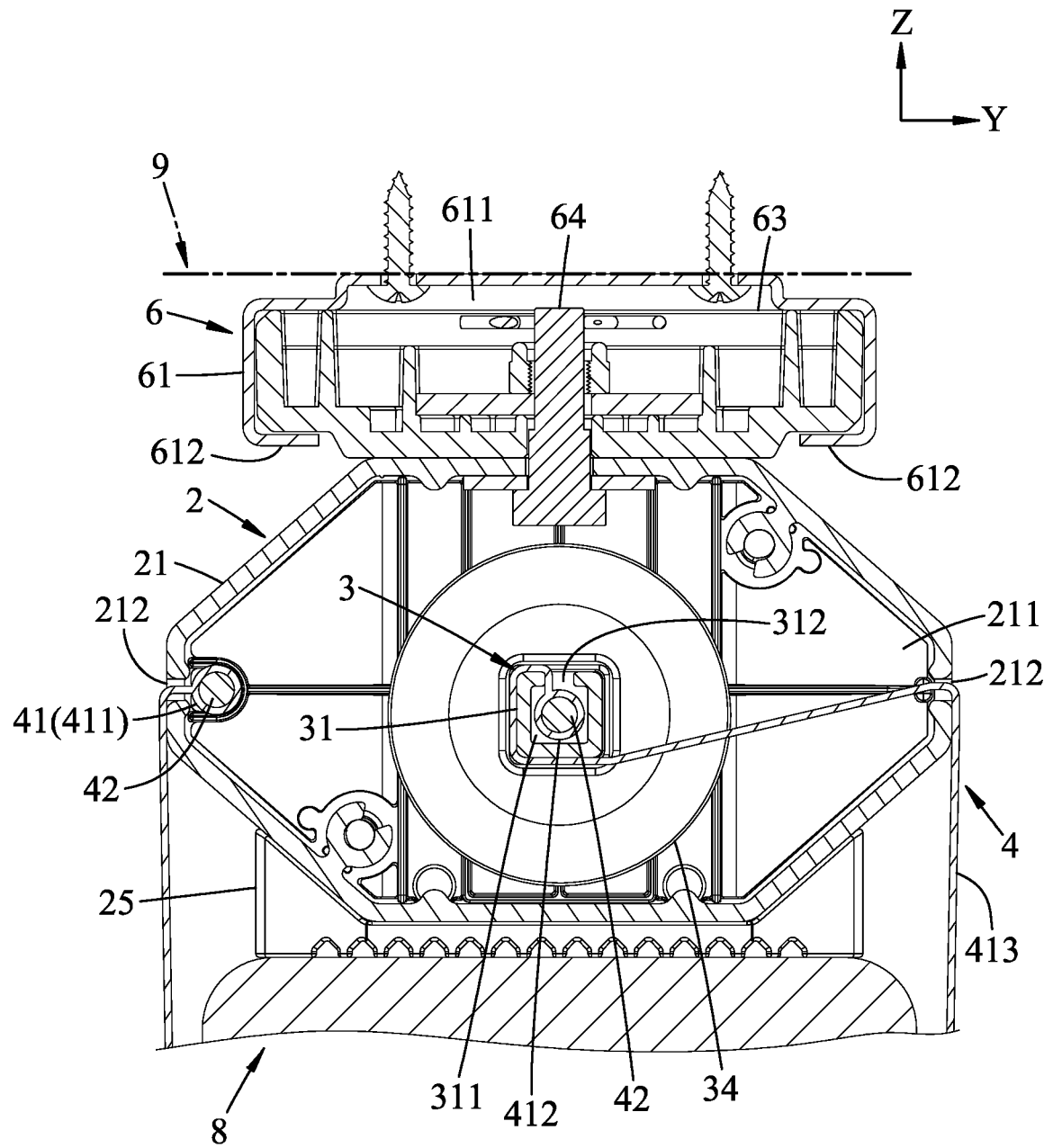
FIG. 7 is a sectional view taken from line VII-VII of FIG. 6.

Referring to FIGS. 3 to 5, an embodiment of a holding device is for supporting and suspending a computer component 8 below a support surface 9. The support surface 9 may be a work surface of a desk (not shown). The holding device of the embodiment includes a holding seat 2, a rotating rod unit 3, a strap unit 4, an adjusting unit 5 and a slide rail unit 6.

With reference to FIGS. 4 to 7, the holding seat 2 includes a seat housing 21, a retaining bracket 22, a front end cap 23, a rear end cap 24 and two spacers 25.

Figure 8:
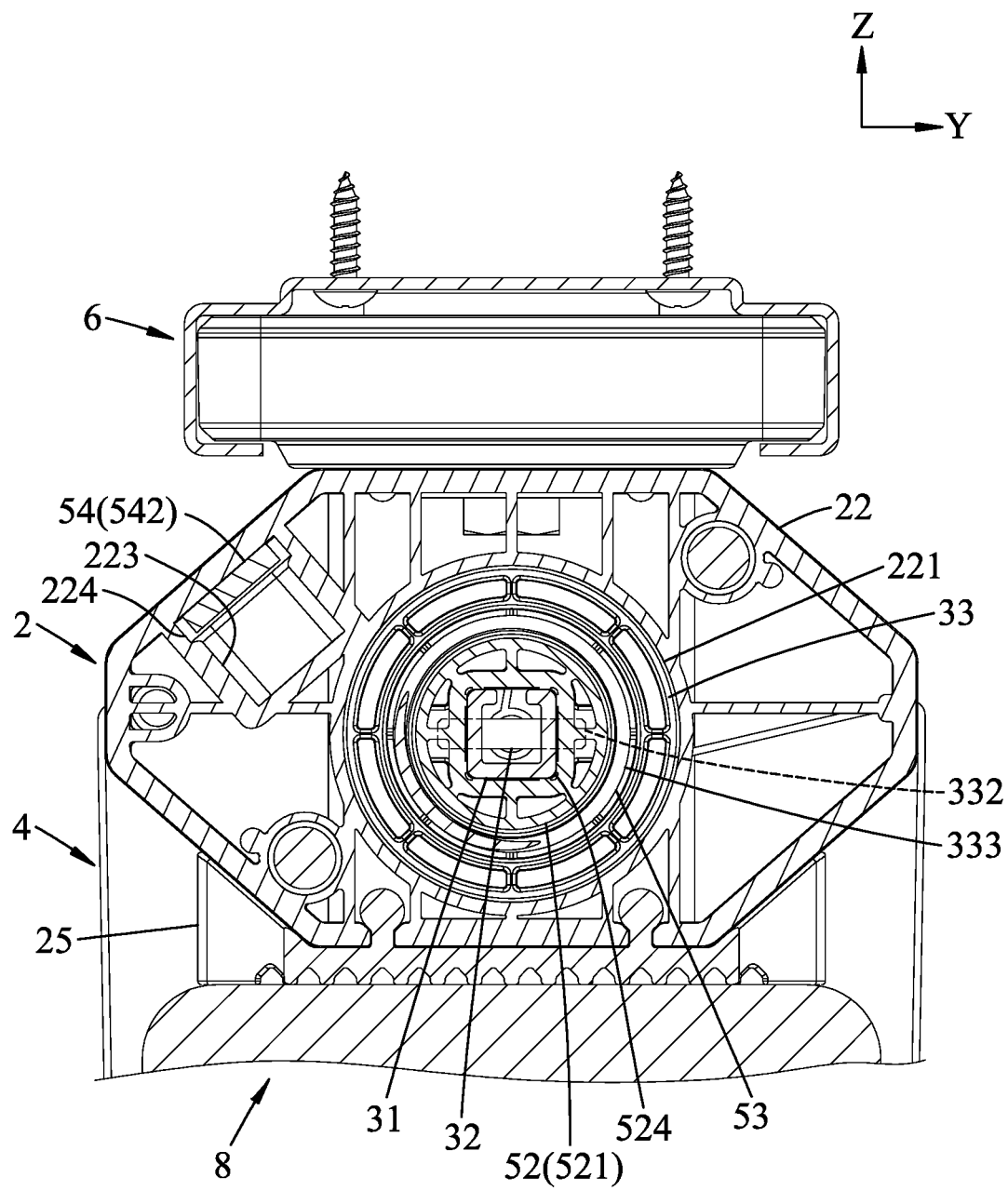
FIG. 8 is a sectional view taken from line VIII-VIII of FIG. 6.

The seat housing 21 has an octagonal cross-section and extends in a front-rear direction (X) to define therein a receiving space 211 opened at front and rear ends thereof. The seat housing 21 has left and right through holes 212 at left and right sides thereof in a left-right direction (Y) that are in communication with the receiving space 211. The retaining bracket 22 is disposed to cover the front opened end of the seat housing 21, and has an axial hole 221 extending along an axis (L) in the front-rear direction (X), upper and lower snap-fit holes 222 formed at a front end thereof, a recess 223 (see FIG. 8) extending in the front-rear direction (X), and an access hole 224 that is formed in the recess 223 and that is in communication with the receiving space 211. The front end cap 23 is disposed to cover the front end of the retaining bracket 22, and has two snap-fit hooks 231 which are interlocked with the upper and lower snap-fit holes 222, respectively. The rear end cap 24 is disposed to cover the rear opened end of the seat housing 21, and has an aligning recess 241 extending along the axis (L) and opened forwardly. The spacers 25 are disposed under the seat housing 21 and are spaced apart from each other in the front-rear direction (X). Each spacer 25 extends downwardly to be interposed between the holding seat 2 and the computer component 8. The spacers 25 are made of a plastic material and each has a bottom portion with serrations for abutment of the computer component 8 thereagainst to protect the computer component 8 from collision with the seat housing 21 and frictionally retain the computer component 8. In other embodiments, only one spacer 25 may be provided, or in other embodiments more than two spacers 25 may be provided and each extends in the front-rear direction (X).

With reference to FIGS. 5 to 8, the rotating rod unit 3 is disposed in the receiving space 211 of the seat housing 21, and includes a rotating rod 31, a retaining pin 32, a retaining disc 33 and a bearing disc 34.

The rotating rod 31 extends along the axis (L) and is received within and rotatable relative to the seat housing 2 about the axis (L). The rotating rod 31 is rail shaped and has a rectangular cross-section. The rotating rod 31 defines a receiving slot 311 extending along the axis (L), and a slit opening 312 at an upper end thereof in communication with the receiving slot 311. The retaining pin 32 extends in the left-right direction (Y) and has two ends extending through the rotating rod 31. The retaining disc 33 has a rectangular sleeve hole 331 to be non-rotatably sleeved on the rotating rod 31. The retaining disc 33 has a retaining slot 332 which extends in the left-right direction (Y) to terminate at two abutment ends such that the ends of the retaining pin 32 respectively abut against the abutment ends to secure the retaining disc 33 to the rotating rod 31. The retaining disc 33 has an annular slot 333 opened forwardly. The bearing disc 34 is non-rotatably sleeved on a rear end of the rotating rod 31, and extends rearwardly into aligning recess 241 of the rear end cap 24 to align the rotating rod 31 along the axis (L) for preventing deflection of the rotating rod 31 from the axis (L).

The strap unit 4 is disposed on the rotating rod unit 3, and includes a flexible strap 41 and two end shafts 42. The flexible strap 41 has a first end 411 which is secured to the holding seat 2, a second end 412 which is opposite to the first end 411 and which is disposed on the rotating rod 31, and a U-shaped bracing section 413 which interconnects the first end 411 and the second end 412 for looping and bracing the computer component 8. The flexible strap 41 extends from the first end 411 through one of the through holes 212 of the seat housing 21 and outwardly of the receiving space 211. The second end 412 is disposed in the receiving slot 311, and the flexible strap 41 extends from the second end 412 through the slit opening 312 and outwardly of the receiving slot 311, is wound around the rotating rod 31, and further extends through the other one of the through holes 212 and outwardly of the receiving space 211.

In this embodiment, the first end 411 and the second end 412 are respectively secured to the end shafts 42 to increase the structural strength of the strap unit 4. In other embodiments, the first end 411 and the second end 412 may be directly connected with the holding seat 2 and the rotating rod 31 such that the end shafts 42 may be dispensed with.

The adjusting unit 5 is disposed on the holding seat 2, and includes a retaining ring 51, a coupling rotary disc 52 and a biasing member 53 disposed on the holding seat 2 and arranged along the axis (L).

The retaining ring 51 is formed on the retaining bracket 22 in the axial hole 221, and has a plurality of retaining teeth 511 which are angularly disposed about the axis (L). The coupling rotary disc 52 is in non-rotatable engagement with the rotating rod 31 to be movable relative to the rotating rod 31 along the axis (L) and to rotate the rotating rod 31. The coupling rotary disc 52 is spaced apart from the retaining disc 33 along the axis (L), and is disposed between the retaining ring 51 and the retaining disc 33. Specifically, the coupling rotary disc 52 has a sleeve portion 520 which is non-rotatably sleeved on the rotating rod 31 and which is disposed radially and inwardly of the retaining ring 51, an operating portion 522 which extends from the sleeve portion 520 along the axis (L) outwardly of the retaining ring 51, and a disc portion 521 which extends radially and outwardly from the sleeve portion 520. The disc portion 521 has a plurality of coupling teeth 523 which are angularly disposed about the axis (L) and which are meshable with the retaining teeth 511. The coupling rotary disc 52 has a coupling hole 524 which extends in the sleeve portion 520 along the axis (L) and which is matingly fitted to the rotating rod 31.

In this embodiment, the rotating rod 31 has a rectangular cross-section, and the sleeve hole 331 of the retaining disc 33 and the coupling hole 524 of the coupling rotary disc 52 are of a rectangular shape to be mattingly fitted to the rotating rod 31 for preventing undesired disengagement during rotation of the rotating rod 31. In other embodiments, the rotating rod 31 may have a cross-section of any other non-circular shape, and the sleeve hole 331 and the coupling hole 524 may be of any other non-circular shape.

The biasing member 53 is sleeved around the rotating rod 31 and compressibly disposed between the coupling rotary disc 52 and the annular slot 333 of the retaining disc 33 to bias the coupling rotary disc 52 along the axis (L) toward the retaining ring 51 so as to bring the coupling teeth 523 to mesh with the retaining teeth 511. In this embodiment, the biasing member 53 is a compression spring. In other embodiments, the biasing member 53 may have one end secured to the rotating rod 31, and the other end abutting against and biasing the coupling rotary disc 52 toward the retaining ring 51.

The adjusting unit 5 further includes a wrench 54 for manually operating rotation of the coupling rotary disc 52. The wrench 54 has a head 541 with a socket 543 (see FIG. 10) which is removably connected with the operating portion 522 of the coupling rotary disc 52, and a shaft 542 which extends from the head 541 which is operable to apply an axial force to disengage the coupling teeth 523 from the retaining teeth 511 and apply a rotational force to rotate the coupling rotary disc 52. The head 541 of the wrench 54 is received in the recess 223 of the retaining bracket 22, and the shaft 542 of the wrench 54 extends through the access hole 224 and is received in the receiving space 211 of the seat housing 21. The front end cap 23 covers the front end of the retaining bracket 22 to conceal the operating portion 522 of the coupling rotary disc 52 and the wrench 54.

The slide rail unit 6 is disposed to secure the holding seat 2 to the support surface 9, and includes a guide rail 61, an end cover 62, a slide key 63 and a pivot pin 64.

The guide rail 61 is securely attached to the underside of the support surface 9 and defines a slide space 611 which extends in the front-rear direction (X) and which is opened downwardly. The guide rail 61 has two lower walls 612 which are spaced apart from each other in the left-right direction (Y), and a rear stop wall 613 which is formed at a rear end thereof for covering the rear end of the slide space 611. The end cover 62 is disposed to cover a front end of the slide space 611. The slide key 63 is connected with the holding seat 2 and is disposed on the lower walls 612 in the slide space 611 to be slidable along the guide rail 61 in the front-rear direction (X). The pivot pin 64 extends in an upright direction (Z) through the holding seat 2 and is securely connected with the slide key 63 to permit the holding seat 2 to rotate relative to the slide rail unit 6.

Figure 9:
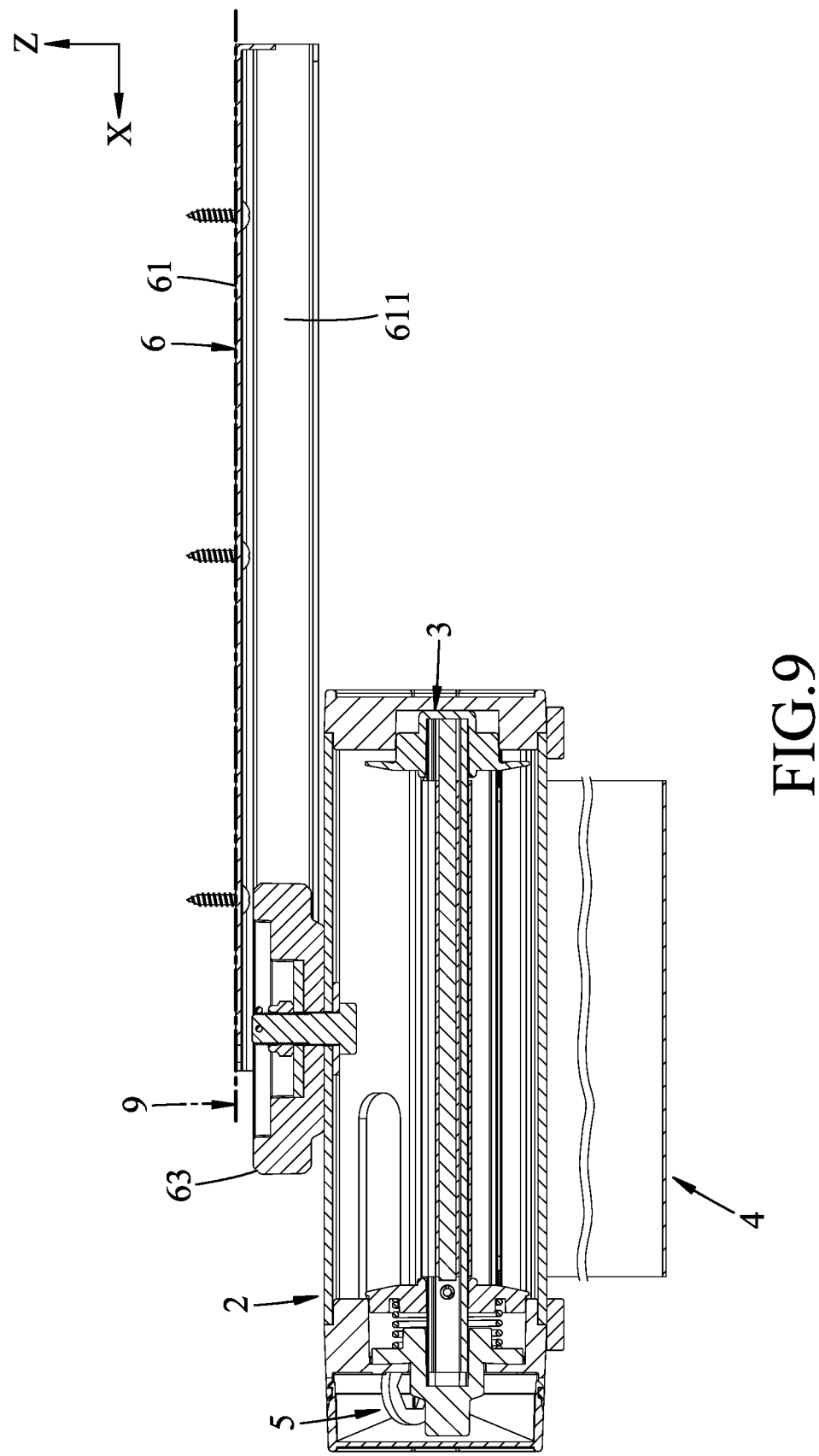
FIGS. 9 to 19 are schematic views illustrating the embodiment during assembly.
Figure 10:
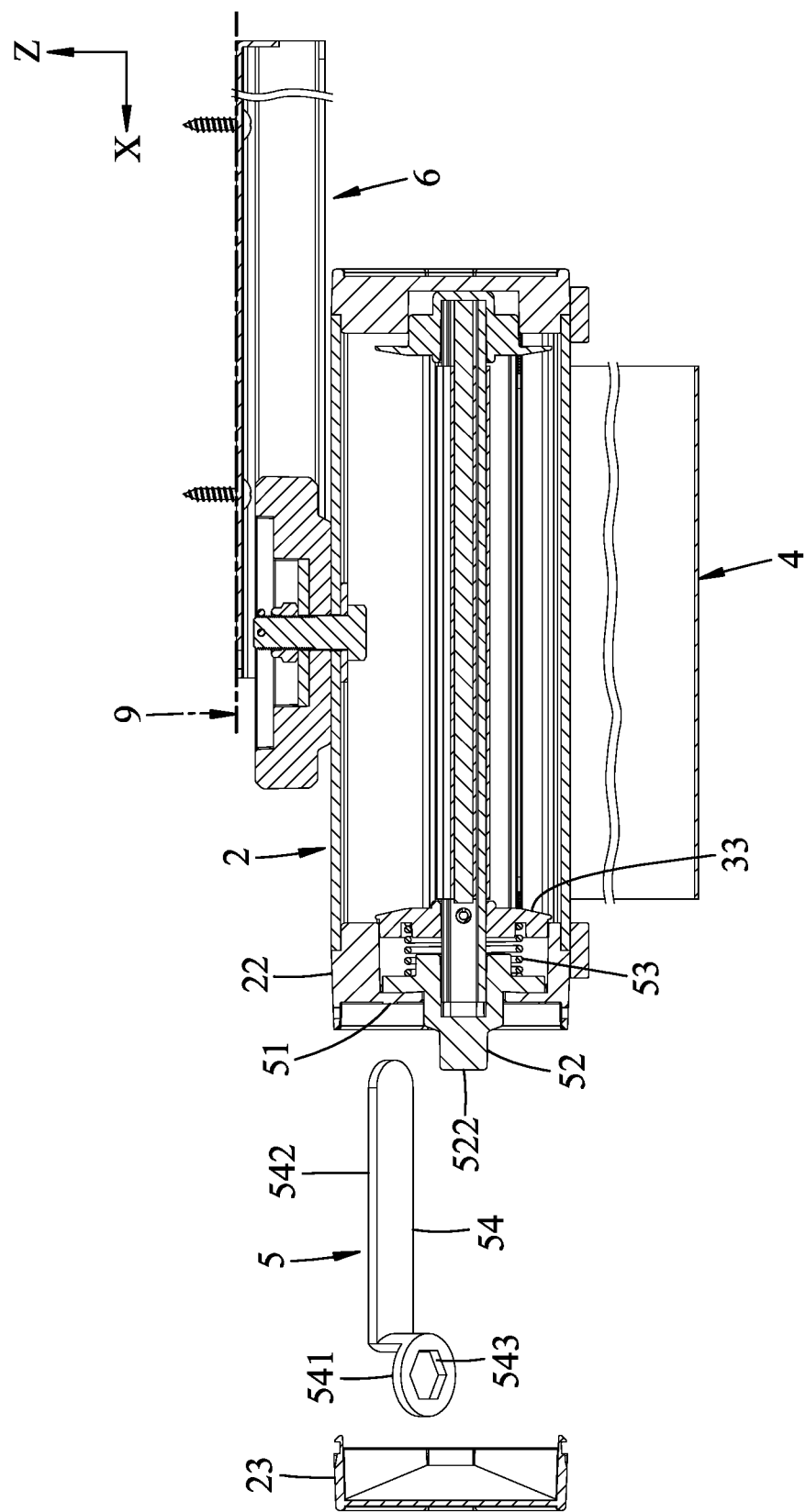
Figure 11:
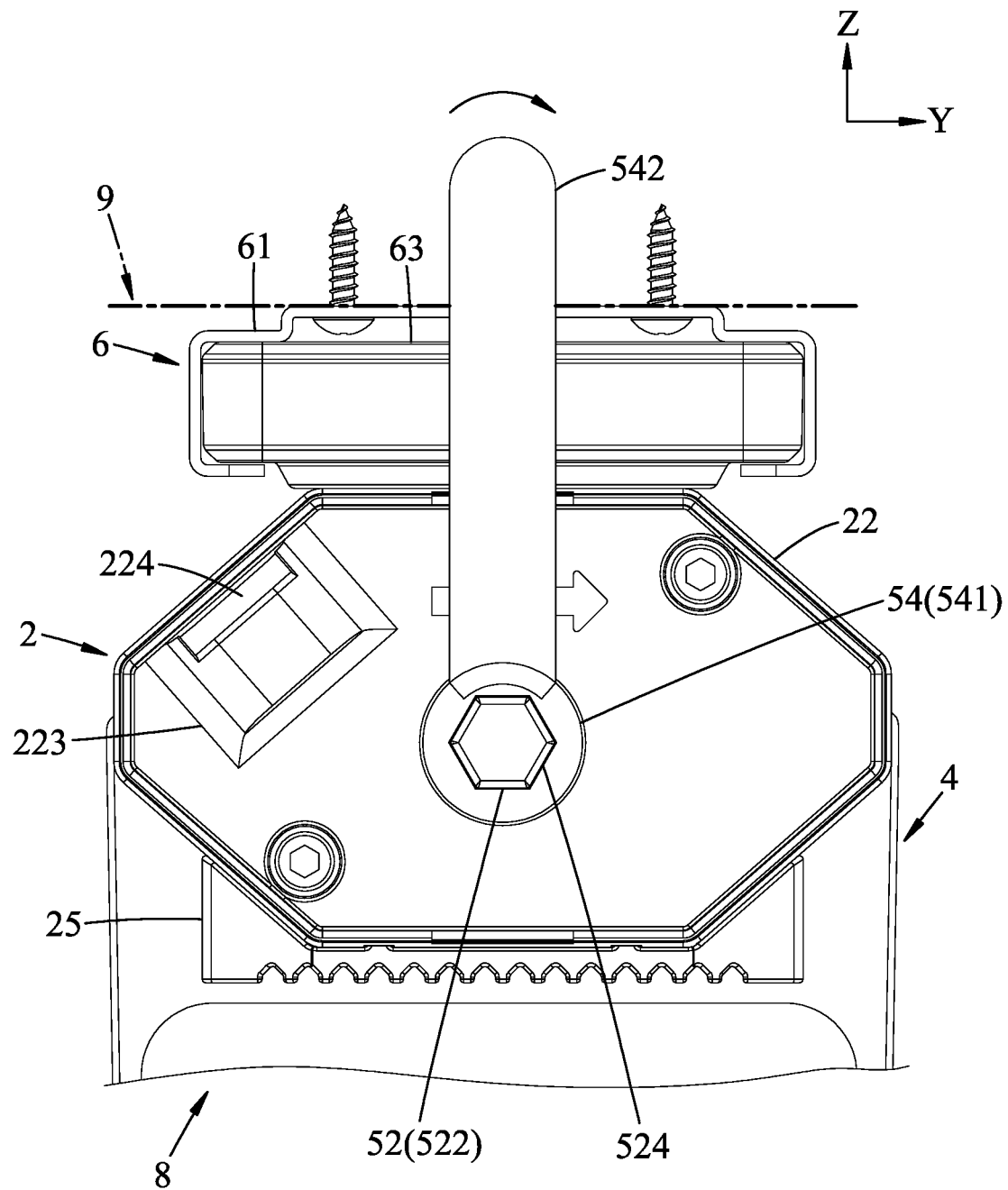
Figure 12:
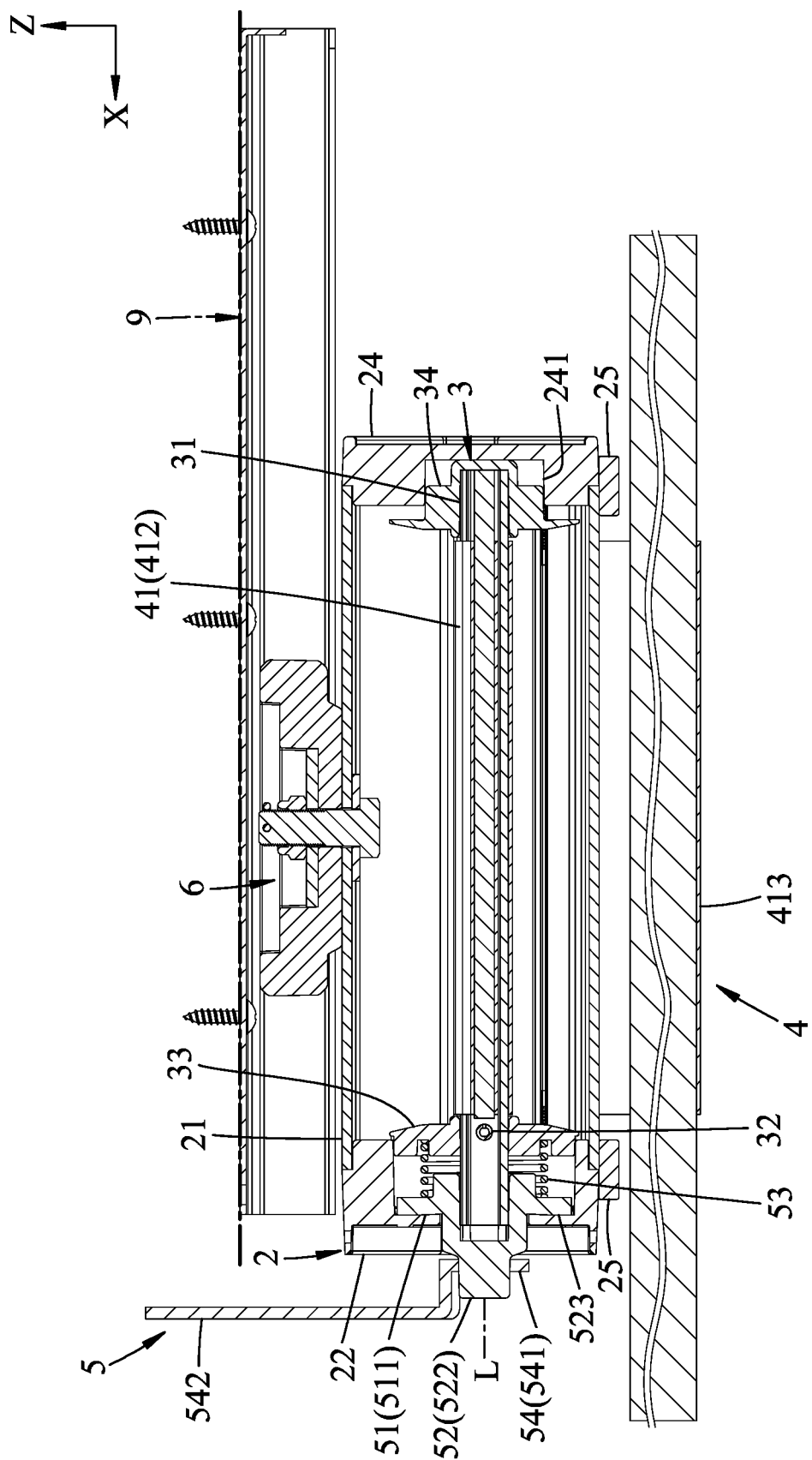
Figure 13:
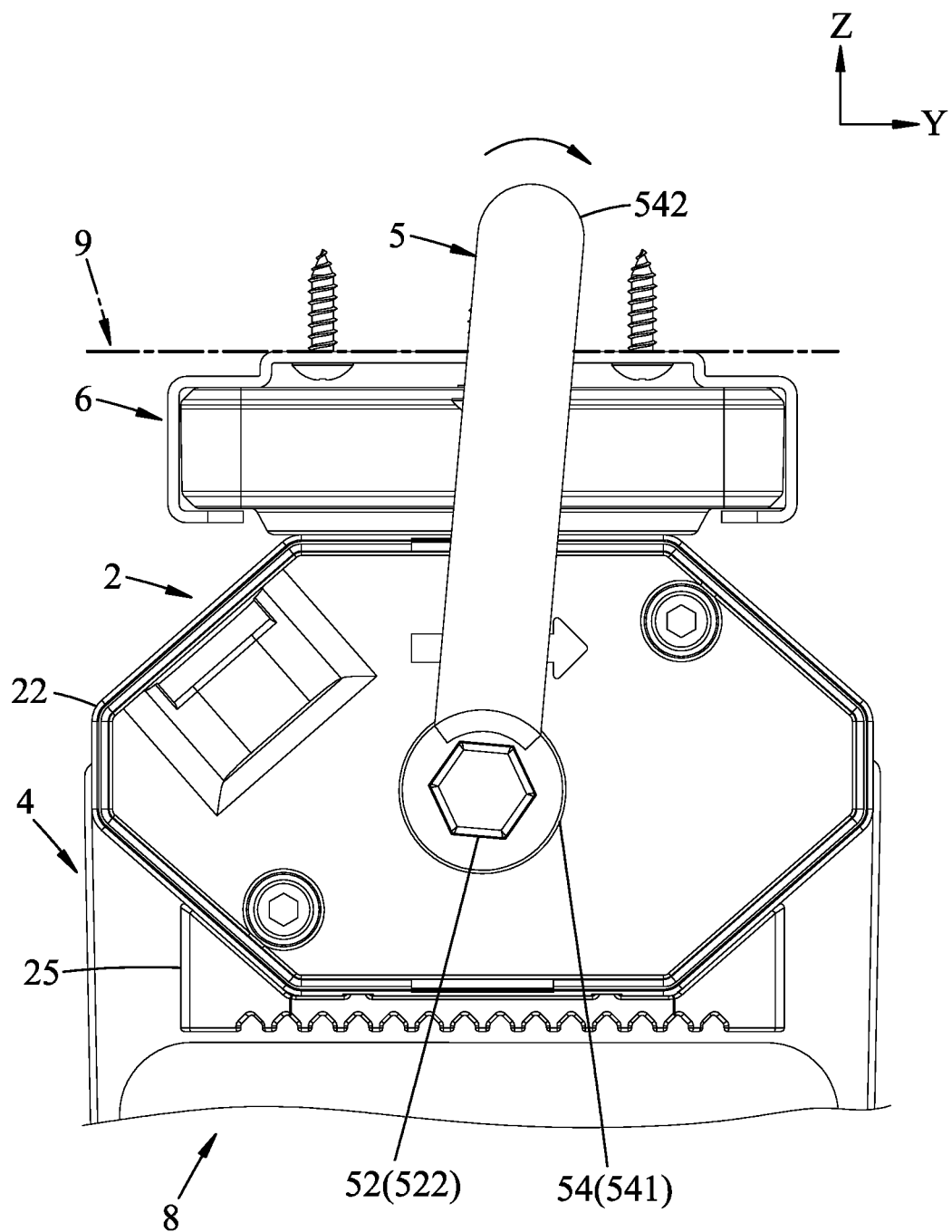
Figure 14:
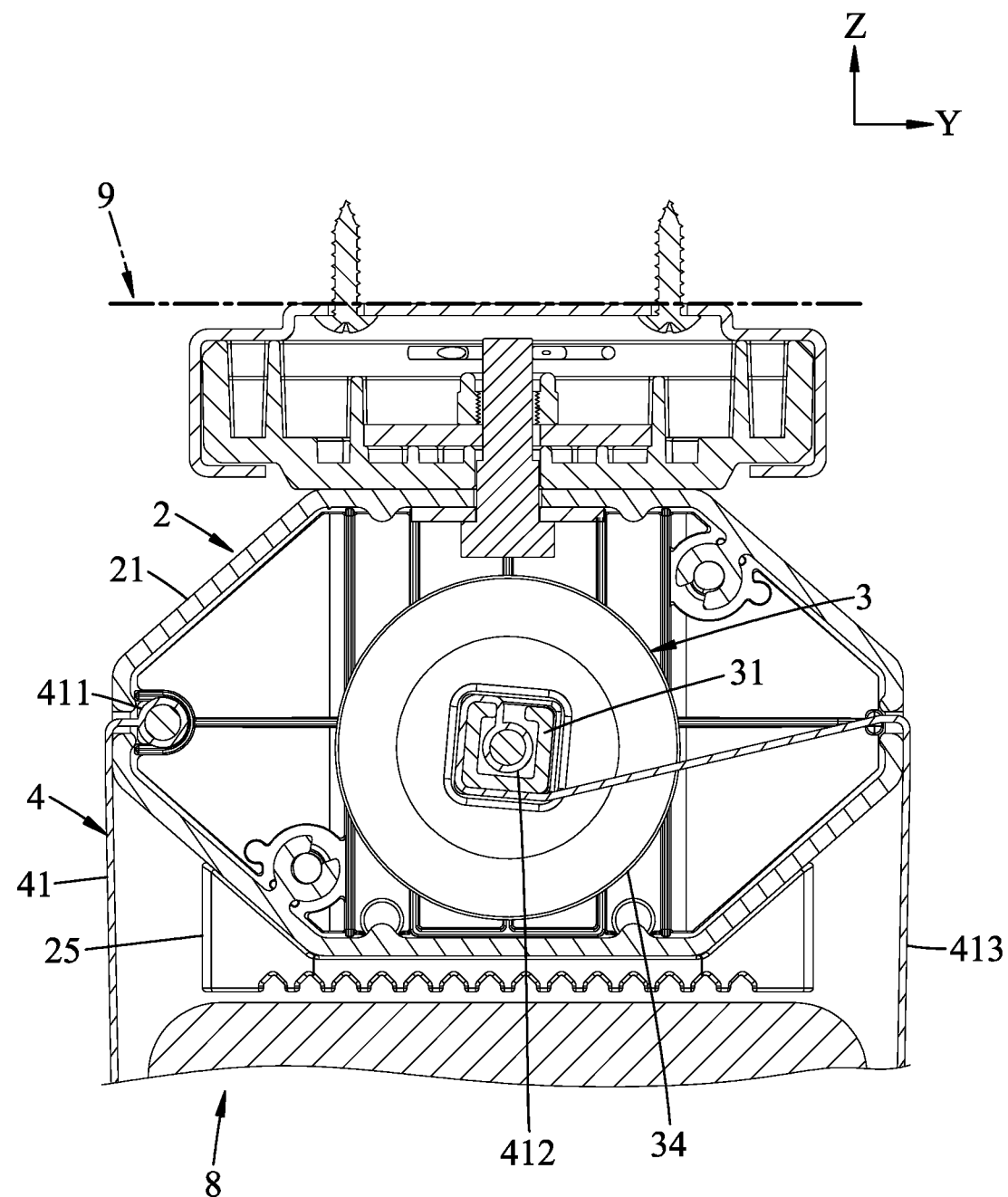
Figure 15:
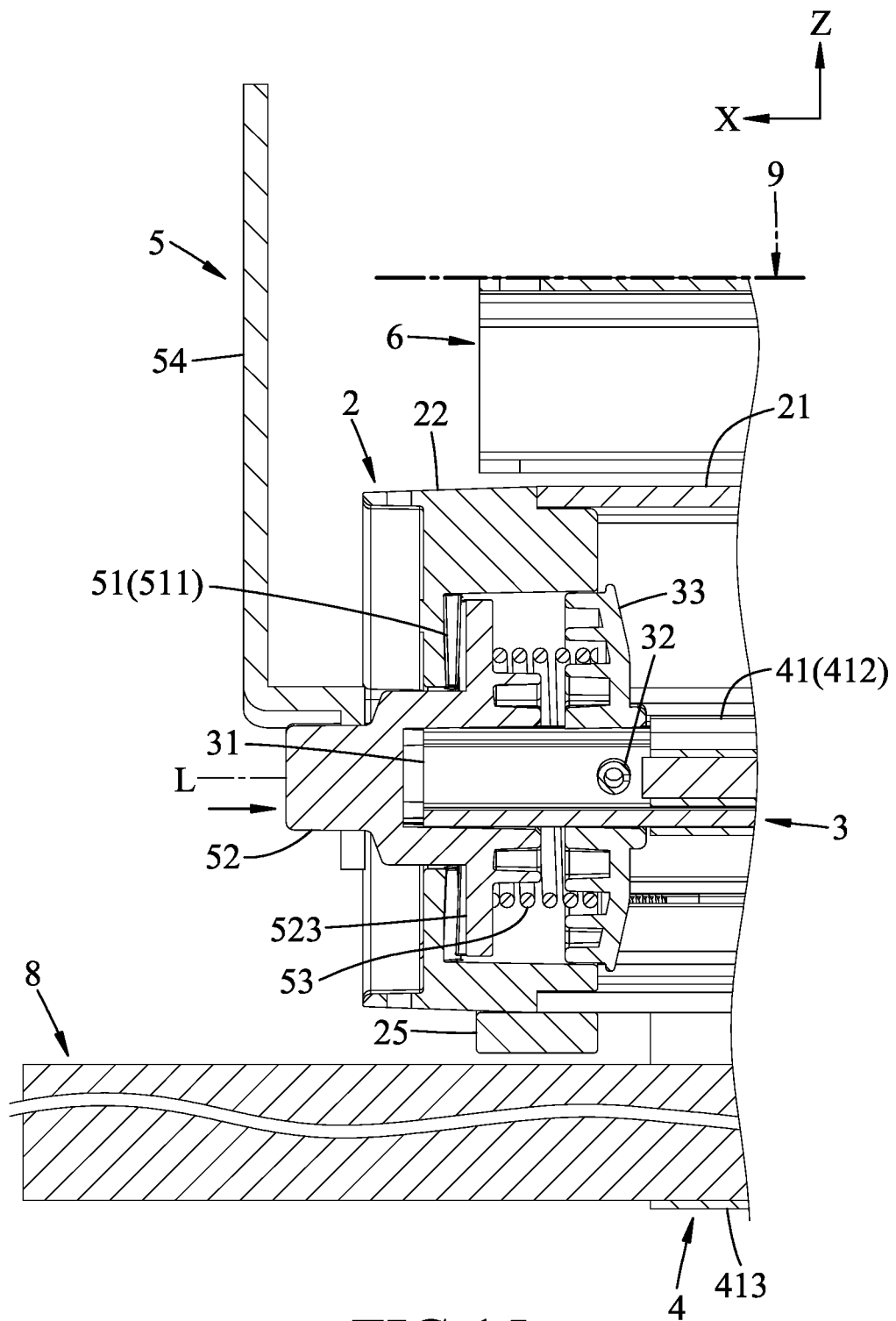
Figure 16:
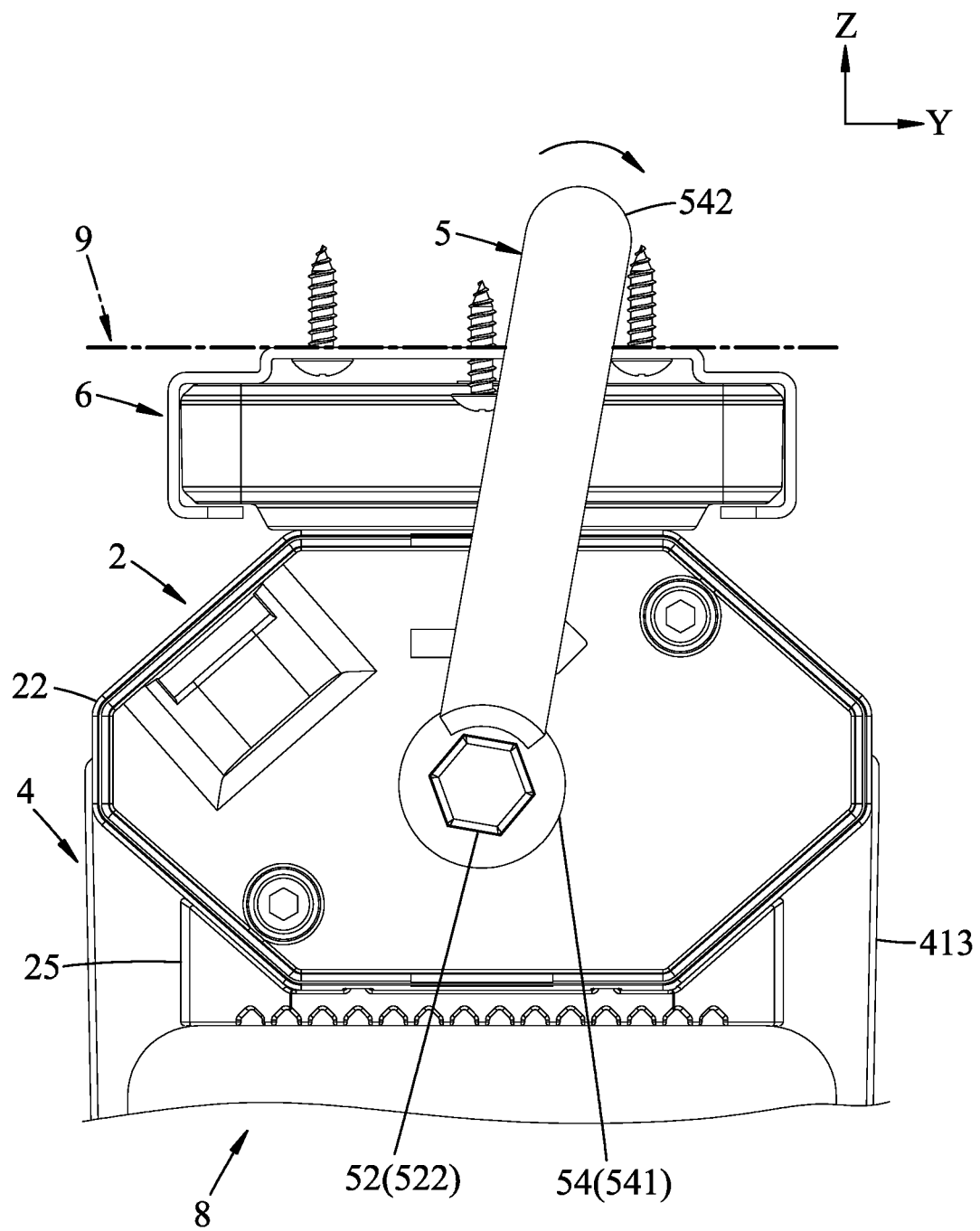
Figure 17:
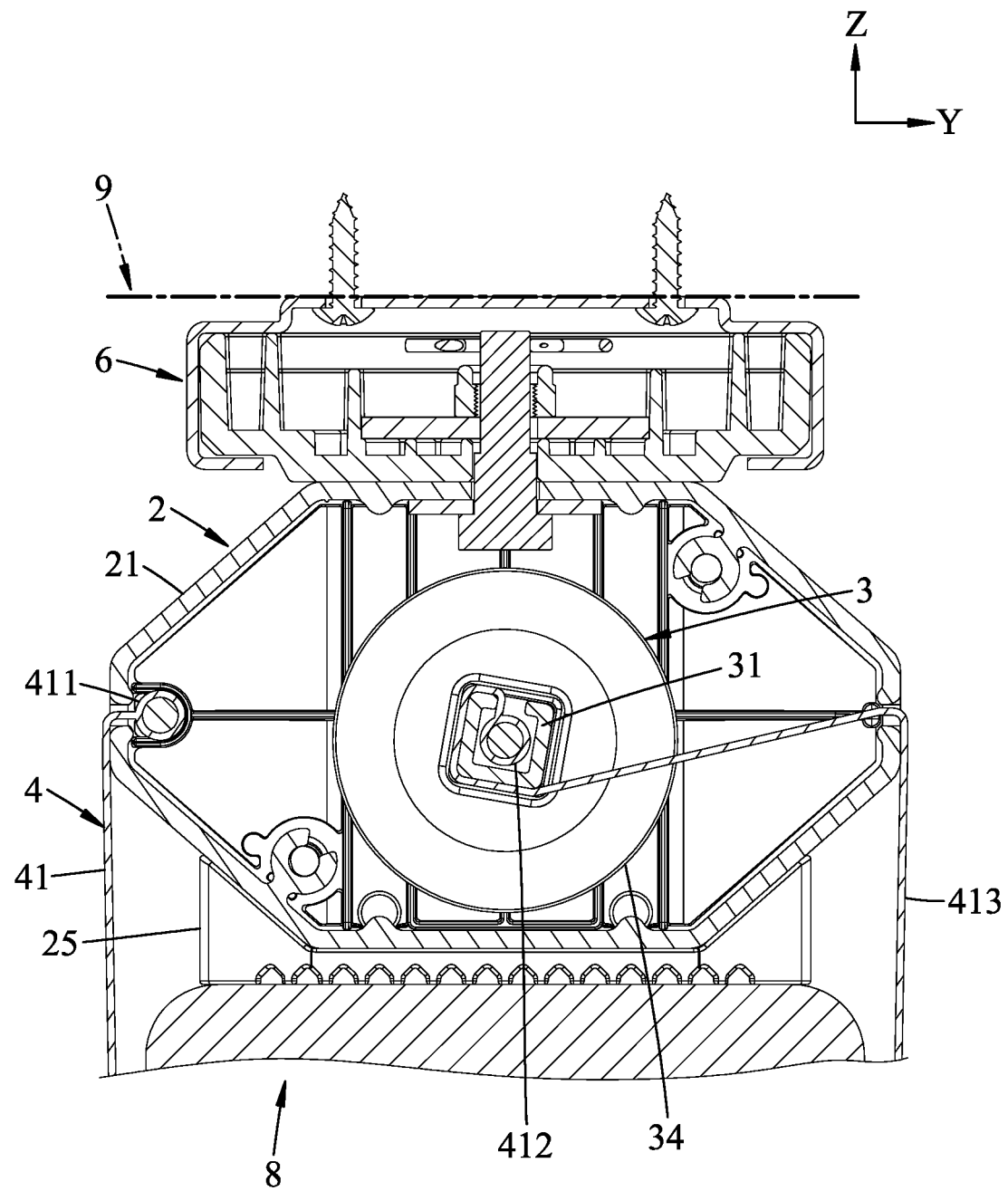
Figure 18:
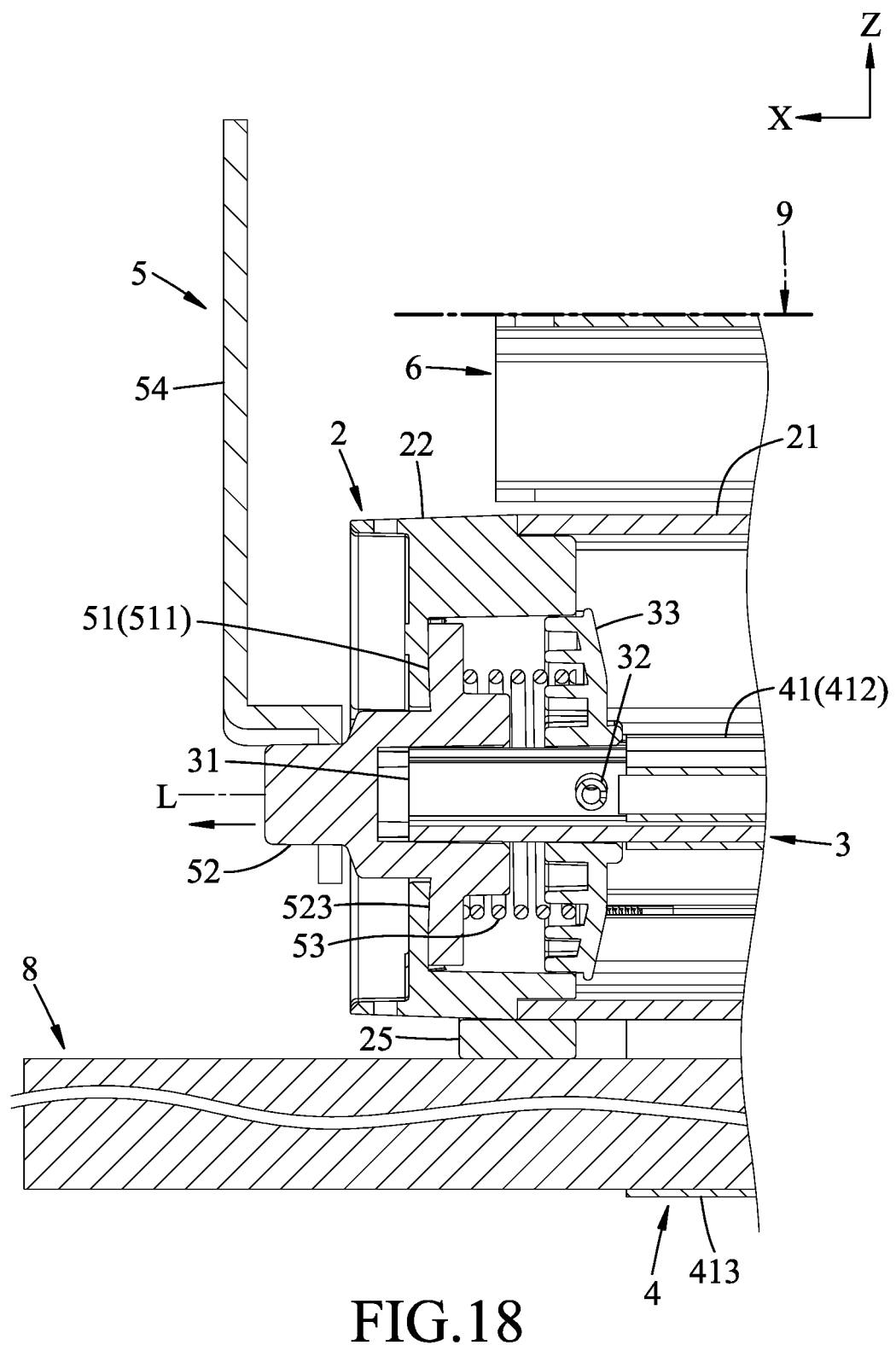
Figure 19:
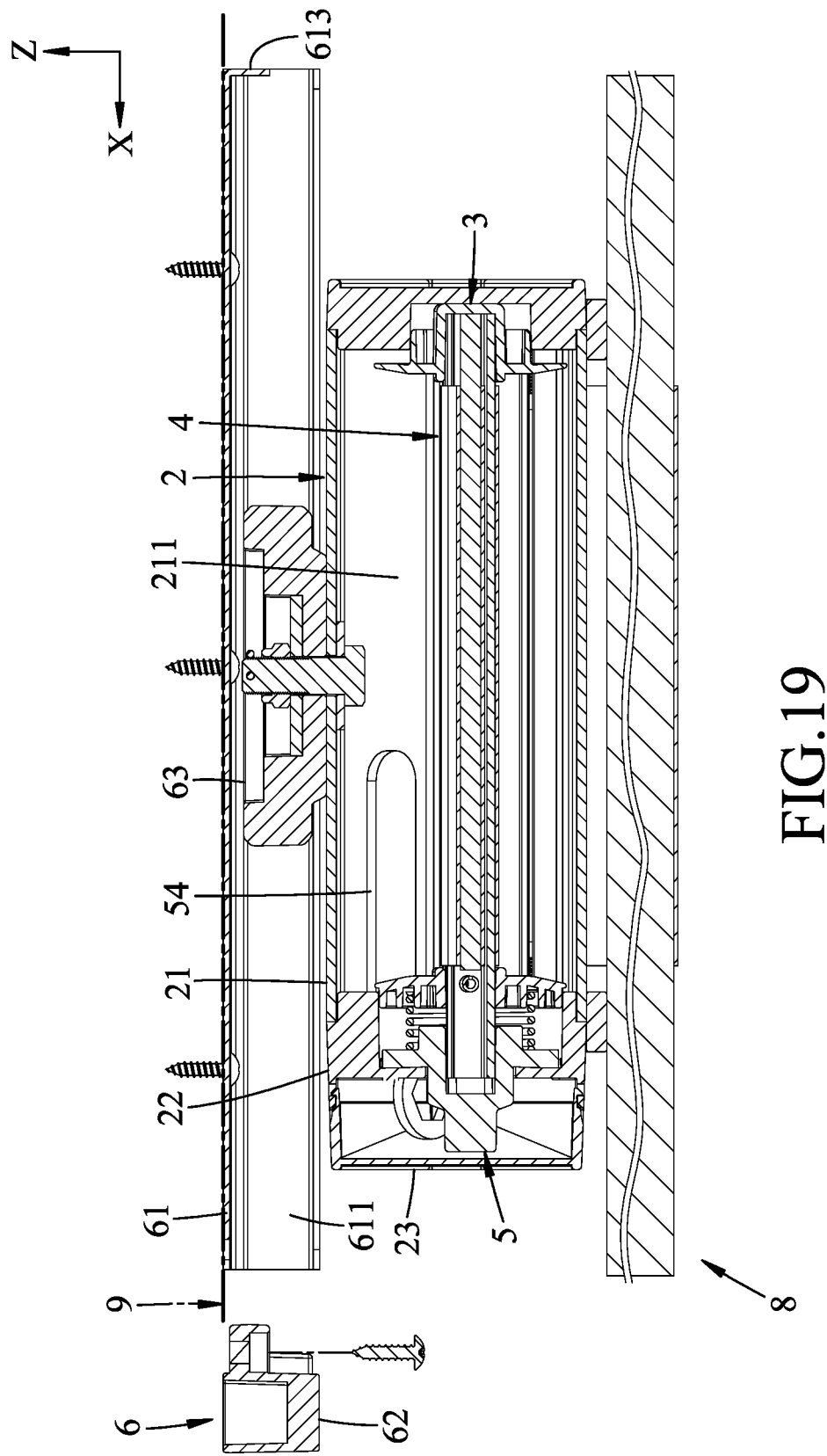

With reference to FIGS. 9 to 19, the assembly of the holding device is now described. Firstly, as shown in FIG. 9, the guide rail 61 is secured to the underside of the support surface 9, and the slide key 63 is slided into the guide rail 61 from the front end of the slide space 611. Subsequently, as shown in FIGS. 10, 11 and 12, the computer component 8 is placed on the bracing section 413 of the flexible strap 41, the front end cap 23 is removed from the retaining bracket 22 to permit removal of the wrench 54 from the retaining bracket 22. The wrench 54 is connected with the operating portion 522 and is operated to apply the axial force and the rotational force to the coupling rotary disc 52. As shown in FIGS. 13, 14 and 15, during rotation of the coupling rotary disc 52, the coupling rotary disc 52 is moved rearwardly to disengage the coupling teeth 523 from the retaining teeth 511, and rotates the rotating rod 31 to reel the flexible strap 41 on the rotating rod 31 so as to shorten the bracing section 413 and move the computer component 8 in the upright direction (Z) and closer to the holding seat 2. Meanwhile, the biasing member 53 is compressed by the coupling rotary disc 52. Then, as shown in FIGS. 16, 17 and 18, the coupling rotary disc 52 is rotated until the computer component 8 abuts against the spacers 25. When the wrench 54 is released, the coupling rotary disc 52 is moved forwardly by means of the biasing member 53 to engage the coupling teeth 523 with the retaining teeth 511 so as to retain the rotating rod 31 to prevent rotation of the rotating rod 31 in an opposite rotational direction for safety purposes. Finally, as shown in FIG. 19, the wrench 54 and the front end cap 23 are placed back to their positions, the end cover 62 is secured to the front end of the guide rail 61 to cover the slide space 611 so as to prevent removal of the slide key 63 from the slide space 611.

When it is desired to remove the computer component 8 from the holding device, the coupling rotary disc 52 is rotated in an opposite rotational direction to rotate the rotating rod 31 so as to unreel the flexible strap 41 to lengthen the bracing section 413 and to move the computer component 8 away from the holding seat 2. The computer component 8 can then be readily removed from the bracing section 413.

With the retaining ring 51, coupling rotary disc 52 and the biasing member 53 being arranged along the axis (L), the holding device is compact and the rotation of the coupling rotary disc 52 is operable with only one hand for adjusting the length of the bracing section 413. Moreover, in this embodiment, the wrench 54 is employed to be used for applying force to the coupling rotary disc 52. In other embodiments, the coupling rotary disc 52 may be configured to be rotated without the need of a hand tool, and the wrench 54 may be dispensed with.

As illustrated, with the coupling rotary disc 52 being operated to rotate the rotating rod 31 for reeling or unreeling the flexible strap 41 to adjust the length of the bracing section 413, and with the biasing member 53 disposed to bias the coupling rotary disc 52 to engage the coupling teeth 523 with the retaining teeth 511 for retaining the rotating rod 31, the adjustment of the flexible strap 41 is operable with one hand so as to be convenient and safe to conduct.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A holding device for supporting and suspending a computer component below a support surface, comprising:
   a holding seat;
   a rotating rod rotatably mounted on said holding seat about an axis;
   a flexible strap having a first end which is secured to said holding seat, a second end which is opposite to said first end and which is disposed on said rotating rod, and a bracing section which interconnects said first end and said second end for looping and bracing the computer component; and
   an adjusting unit disposed on said holding seat, and including a retaining ring, a coupling rotary disc and a biasing member disposed on said holding seat and arranged along the axis, said retaining ring being formed on said holding seat adjacent to an end of said rotating rod, and having a plurality of retaining teeth which are angularly disposed about the axis, said coupling rotary disc being in non-rotatable engagement with said rotating rod to be movable relative to said rotating rod along the axis and to rotate said rotating rod, and having a plurality of coupling teeth which are angularly disposed about the axis and which are meshable with said retaining teeth, said biasing member being sleeved around said rotating rod to bias said coupling rotary disc toward said retaining ring so as to bring said coupling teeth to mesh with said retaining teeth.

2. The holding device of claim 1, wherein said coupling rotary disc has a sleeve portion which is non-rotatably sleeved on said rotating rod and which is disposed radially and inwardly of said retaining ring, an operating portion which extends from said sleeve portion along the axis outwardly of said retaining ring, and a disc portion which extends radially and outwardly from said sleeve portion, said coupling teeth being formed on said disc portion.

3. The holding device of claim 2, wherein said adjusting unit further includes a wrench having a head which is removably connected with said operating portion of said coupling rotary disc, and a shaft which extends from said head which is operable to apply an axial force to disengage said coupling teeth from said retaining teeth and apply a rotational force to rotate said coupling rotary disc.

4. The holding device of claim 2, wherein said rotating rod has a non-circular cross-section, said coupling rotary disc having a coupling hole which extends in said sleeve portion along the axis and which is matingly fitted to said rotating rod.

5. The holding device of claim 1, wherein said holding seat includes a seat housing for receiving said rotating rod therein, and at least one spacer which is disposed under said seat housing and which extends downwardly to be interposed between said holding seat and the computer component.

6. The holding device of claim 5, wherein said spacer is made of plastic material and has a bottom portion with serrations for abutment of the computer component thereagainst.

7. The holding device of claim 1, further comprising a slide rail unit, said slide rail unit including a guide rail which is attachable to the underside of the support surface and which extends in a direction of the axis, and a slide key which is connected with said holding seat and which is disposed on and slidable along said guide rail in the direction of the axis.

8. The holding device of claim 7, wherein said slide rail unit further includes a pivot pin which extends in an upright direction through said holding seat and is securely connected with said slide key to permit said holding seat to rotate relative to said slide rail unit.

9. The holding device of claim 1, further comprising a retaining disc which is non-rotatably sleeved on said rotating rod and spaced apart from said coupling rotary disc along the axis, said coupling rotary disc being disposed between said retaining ring and said retaining disc, said biasing member being compressibly disposed between said coupling rotary disc and said retaining disc.

10. The holding device of claim 1, wherein said rotating rod is rail shaped and defines a receiving slot extending along the axis for receiving said second end of said flexible strap, and a slit opening in communication with said receiving slot for permit extension of said flexible strap.

* * * * *